(12) United States Patent
Quiroz de la Mora et al.

(10) Patent No.: US 10,948,056 B2
(45) Date of Patent: Mar. 16, 2021

(54) ELEVATION MECHANISM FOR A CENTRAL INPUT SELECTOR KNOB

(71) Applicant: Continental Automotive Systems, Inc., Auburn Hills, MI (US)

(72) Inventors: Luis Ernesto Quiroz de la Mora, Tlaquepaque (MX); Johan Gomez Martinez, Zapopan (MX); Roberto Arriola Martinez, Tlaquepaque (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/175,197

(22) Filed: Oct. 30, 2018

(65) Prior Publication Data

US 2019/0195322 A1 Jun. 27, 2019

Related U.S. Application Data

(60) Provisional application No. 62/610,192, filed on Dec. 23, 2017.

(51) Int. Cl.
*F16H 19/00* (2006.01)
*F16H 19/02* (2006.01)
(Continued)

(52) U.S. Cl.
CPC .......... *F16H 19/02* (2013.01); *F16H 25/125* (2013.01); *G05G 1/04* (2013.01); *G05G 1/087* (2013.01); *G05G 25/00* (2013.01); *G05G 9/047* (2013.01)

(58) Field of Classification Search
CPC ........ F16H 19/02; F16H 25/125; F16H 59/08; F16H 2059/081; G05G 1/04; G05G 25/00; G05G 9/047; G05G 25/047; G05G 1/087; B60K 2370/126; B60K 2370/158; B60K 37/06; G01D 5/145; H01H 2003/0266; H01H 2003/085; H01H 3/08
See application file for complete search history.

(56) References Cited

U.S. PATENT DOCUMENTS 3,983,770 A * 10/1976 Skrentner ............... B23B 25/06
82/19
4,327,713 A * 5/1982 Okazaki ............. A61H 23/0254
601/134
(Continued)

FOREIGN PATENT DOCUMENTS

| CN | 207190797 U | 4/2018 |
|---|---|---|
| EP | 1768009 A1 | 3/2007 |
| JP | 2001297652 A | 10/2001 |

*Primary Examiner* — Zakaria Elahmadi

(57) ABSTRACT

An elevation mechanism for a central input selector knob includes: a cylindrical cam having two cylindrical rails; a central input device mounted on a slider cylinder having two opposite ends of a pin that run in the two cylindrical rails to move the central input device between an operation position and a storage position; a cap that has two opposite guiding ribs configured to slide into rails of a main housing, the cap being attached to the main housing such that the slider cylinder is enclosed by the main housing and the cap; and a motor having an axis where a second gear is mounted, the second gear being configured and arranged to transmit movement to a first gear thereby causing the slider cylinder to move thereby moving the central input device between the operation position and the storage position.

3 Claims, 21 Drawing Sheets

(51) Int. Cl.
*F16H 25/12* (2006.01)
*G05G 25/00* (2006.01)
*G05G 1/04* (2006.01)
*G05G 1/08* (2006.01)
*G05G 9/047* (2006.01)

(56) References Cited

U.S. PATENT DOCUMENTS

| | | | | |
|---|---|---|---|---|
| 5,384,442 A * | 1/1995 | Danner | ............ | G05G 1/087 |
| | | | | 200/336 |
| 5,517,952 A * | 5/1996 | Wielenga | ............ | F01B 3/0079 |
| | | | | 123/45 R |
| 5,678,578 A * | 10/1997 | Kossak | ............ | A61C 15/046 |
| | | | | 132/322 |
| 6,362,538 B1 | 3/2002 | Reed et al. | | |
| 6,564,661 B2 * | 5/2003 | DeJonge | ............ | B60K 37/06 |
| | | | | 74/335 |
| 7,705,261 B1 * | 4/2010 | Chen | ............ | H01H 19/36 |
| | | | | 200/566 |
| 8,534,160 B2 * | 9/2013 | Giuliani | ............ | G05G 1/087 |
| | | | | 74/553 |
| 9,465,375 B2 | 10/2016 | Jolda et al. | | |
| 9,810,314 B2 * | 11/2017 | Behounek | ............ | F16H 59/08 |
| 10,019,031 B2 | 7/2018 | Hu | | |
| 10,081,969 B2 * | 9/2018 | Alexander | ............ | E05B 83/28 |
| 10,100,926 B2 * | 10/2018 | Rake | ............ | F16H 59/08 |
| 10,240,385 B2 * | 3/2019 | Park | ............ | E05F 15/697 |
| 2005/0034965 A1 * | 2/2005 | Uehira | ............ | G05G 1/087 |
| | | | | 200/341 |
| 2006/0037424 A1 * | 2/2006 | Pickering | ............ | F16H 59/08 |
| | | | | 74/473.3 |
| 2006/0100059 A1 * | 5/2006 | Nonaka | ............ | G05G 5/06 |
| | | | | 477/121 |
| 2007/0204718 A1 | 9/2007 | Strait et al. | | |
| 2007/0247420 A1 | 10/2007 | Strohband et al. | | |
| 2012/0103743 A1 * | 5/2012 | Hong | ............ | F16D 41/063 |
| | | | | 192/45.1 |
| 2012/0285280 A1 * | 11/2012 | Chang | ............ | G02B 7/022 |
| | | | | 74/411 |
| 2013/0112532 A1 * | 5/2013 | Suzuki | ............ | G05G 9/047 |
| | | | | 200/4 |
| 2013/0139621 A1 * | 6/2013 | Nishikawa | ............ | F16H 25/125 |
| | | | | 74/56 |
| 2013/0258507 A1 * | 10/2013 | Uno | ............ | G02B 7/023 |
| | | | | 359/827 |
| 2015/0167827 A1 * | 6/2015 | Fett | ............ | F16H 59/02 |
| | | | | 74/473.3 |
| 2015/0303009 A1 * | 10/2015 | Seo | ............ | H01H 25/06 |
| | | | | 200/4 |
| 2016/0138704 A1 * | 5/2016 | Watanabe | ............ | G05G 5/08 |
| | | | | 74/473.23 |
| 2016/0144529 A1 * | 5/2016 | Barnett | ............ | F16H 63/30 |
| | | | | 30/381 |
| 2016/0238128 A1 * | 8/2016 | Rake | ............ | F16H 59/08 |

* cited by examiner

ELEVATION MECHANISM FOR A CENTRAL INPUT SELECTOR KNOB

BACKGROUND

Some automotive vehicles include a central selector knob with an elevation mechanism. The elevation mechanism raises the selector knob when the vehicle's engine is started (or when the vehicle is turned on) and returns the selector knob to a hidden, lowered, and retracted position when the vehicle is turned off.

FIG. 1 depicts a selector knob 100 in a central console of an automotive vehicle in a lowered retracted storage position.

FIG. 2 depicts the selector knob 100 in a raised or elevated position for use or operation.

A conventional elevation mechanism is depicted in FIG. 3 in which 336 is the motor, 356 is a rubber band used to move gears 352 and 353, then two worm shafts along with two guiding bars produce a linear rising (or elevation) movement.

The elevation mechanism depicted in FIG. 3 has some disadvantages associated with it, including: a relatively large volume is required to allocate its kinematic configurations; a relatively large number of components are required to raise and hide the selector knob; relatively low reliability caused by the amount of components required and caused also by the use of flexible components in the mechanism; and relatively poor performance with respect to bearing high axial forces without being damaged.

As such, an elevation mechanism for an automotive central input selector knob that reduces the volume of the elevation mechanism, reduces the amount of components and therefore the cost of the elevation mechanism, increases the reliability of the elevation mechanism by improving its robustness, and provides a solution to increase the capability of the elevation mechanism to bear axial forces would be an improvement relative to conventional elevation mechanisms for an automotive central input selector knob.

BRIEF SUMMARY

Embodiments of the invention are directed to an elevation mechanism for a central input selector knob that includes: a cylindrical cam having two cylindrical rails; a central input device mounted on a slider cylinder having two opposite ends of a pin that run in the two cylindrical rails to move the central input device between an operation position and a storage position; a cap that has two opposite guiding ribs configured to slide into rails of a main housing, the cap being attached to the main housing such that the slider cylinder is enclosed by the main housing and the cap; and a motor having an axis where a second gear is mounted, the second gear being configured and arranged to transmit movement to a first gear thereby causing the slider cylinder to move thereby moving the central input device between the operation position and the storage position.

DETAILED DESCRIPTION

Figure 1:
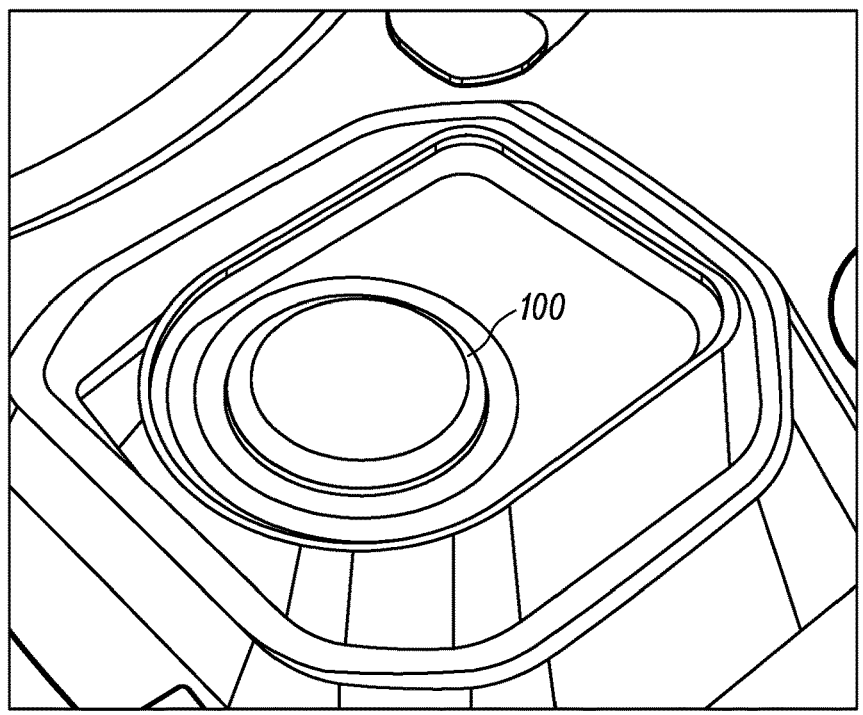
FIG. 1 depicts a selector knob in a central console of an automotive vehicle in a lowered retracted position.
Figure 2:
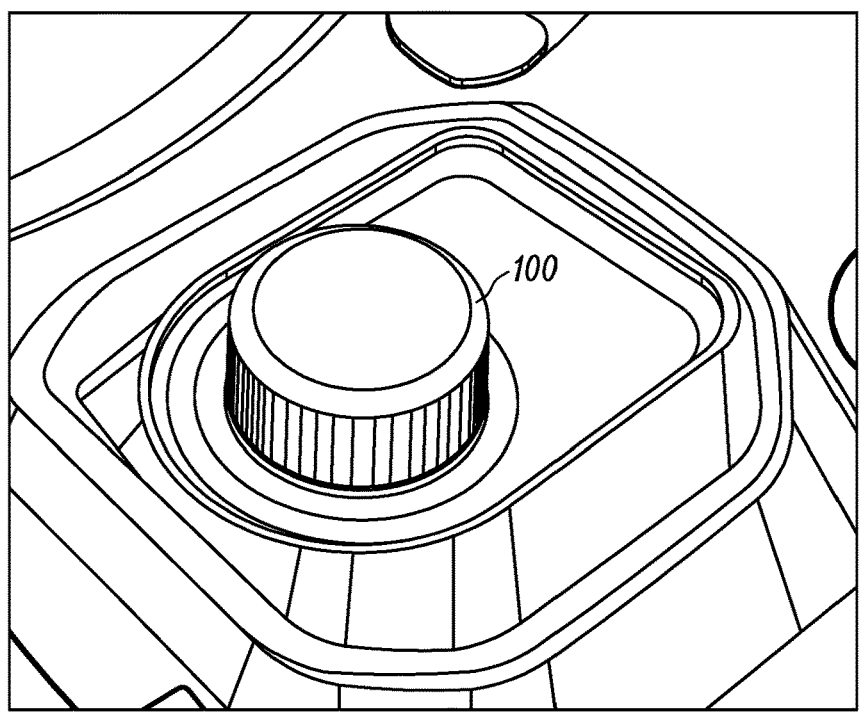
FIG. 2 depicts the selector knob in a raised or elevated position for use or operation.
Figure 3:
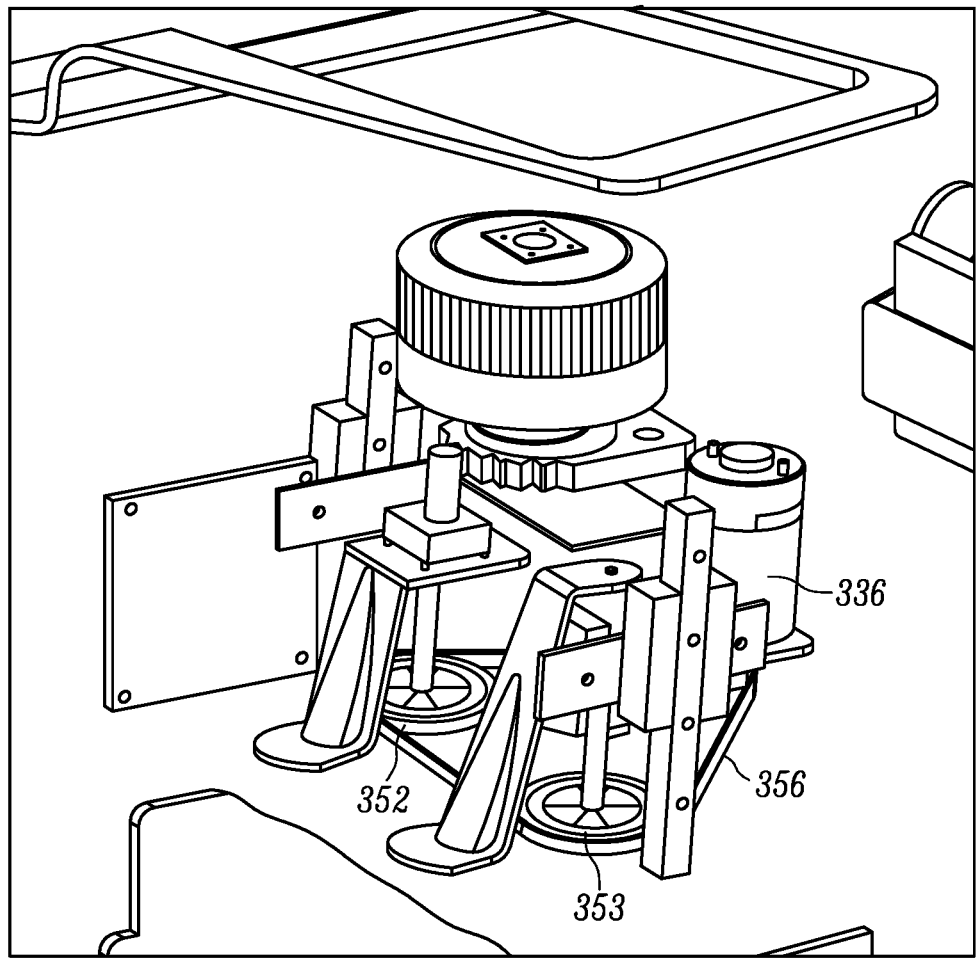
FIG. 3 depicts a conventional elevation mechanism.
Figure 4:
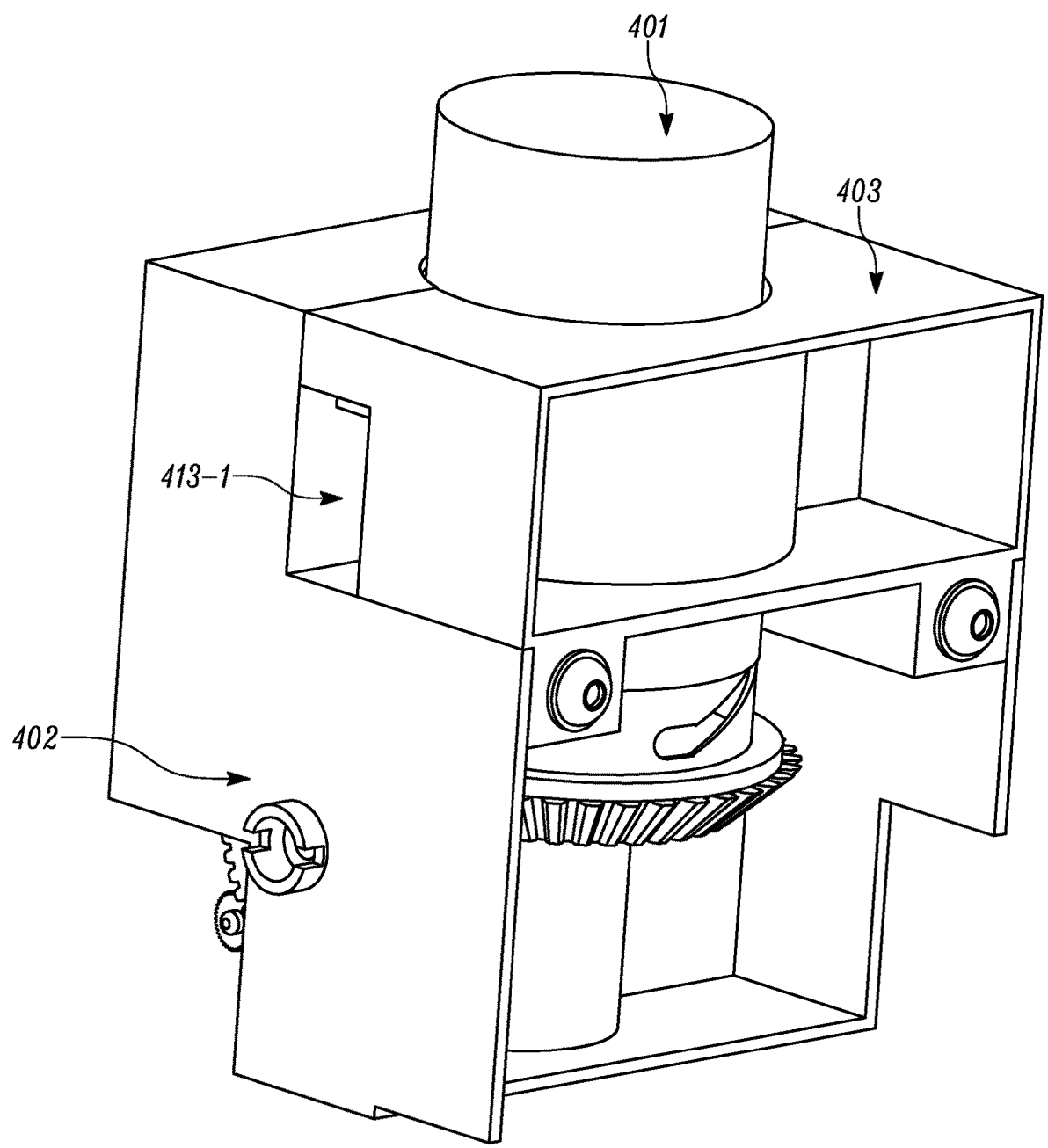
FIGS. 4 and 5 show a central input device in operation position that is attached to a multifunction switch which acts like a joystick and is placed inside a slider cylinder.
Figure 5:
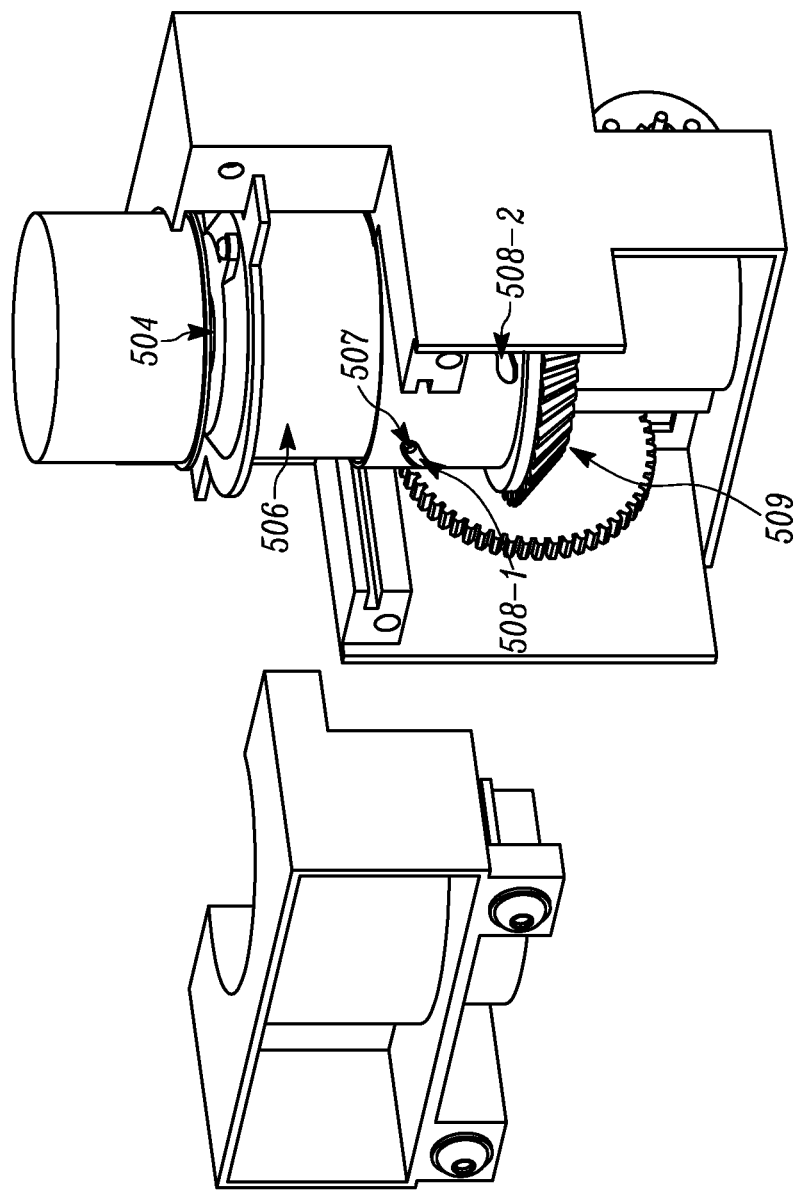

FIGS. 4 and 5 show a central input device (also referred to herein as a selector knob) 401 in operation position that is attached to a multifunction switch 504 which acts like a joystick and is placed inside a slider cylinder 506. The slider cylinder 506 has a metallic pin 507 inserted into and positioned across the slider cylinder. The opposite ends of the metallic pin run in cylindrical rails 508-1 and 508-1 of a cylindrical cam 509 to place the central input device 401 in operation or storage position.

Figure 6:
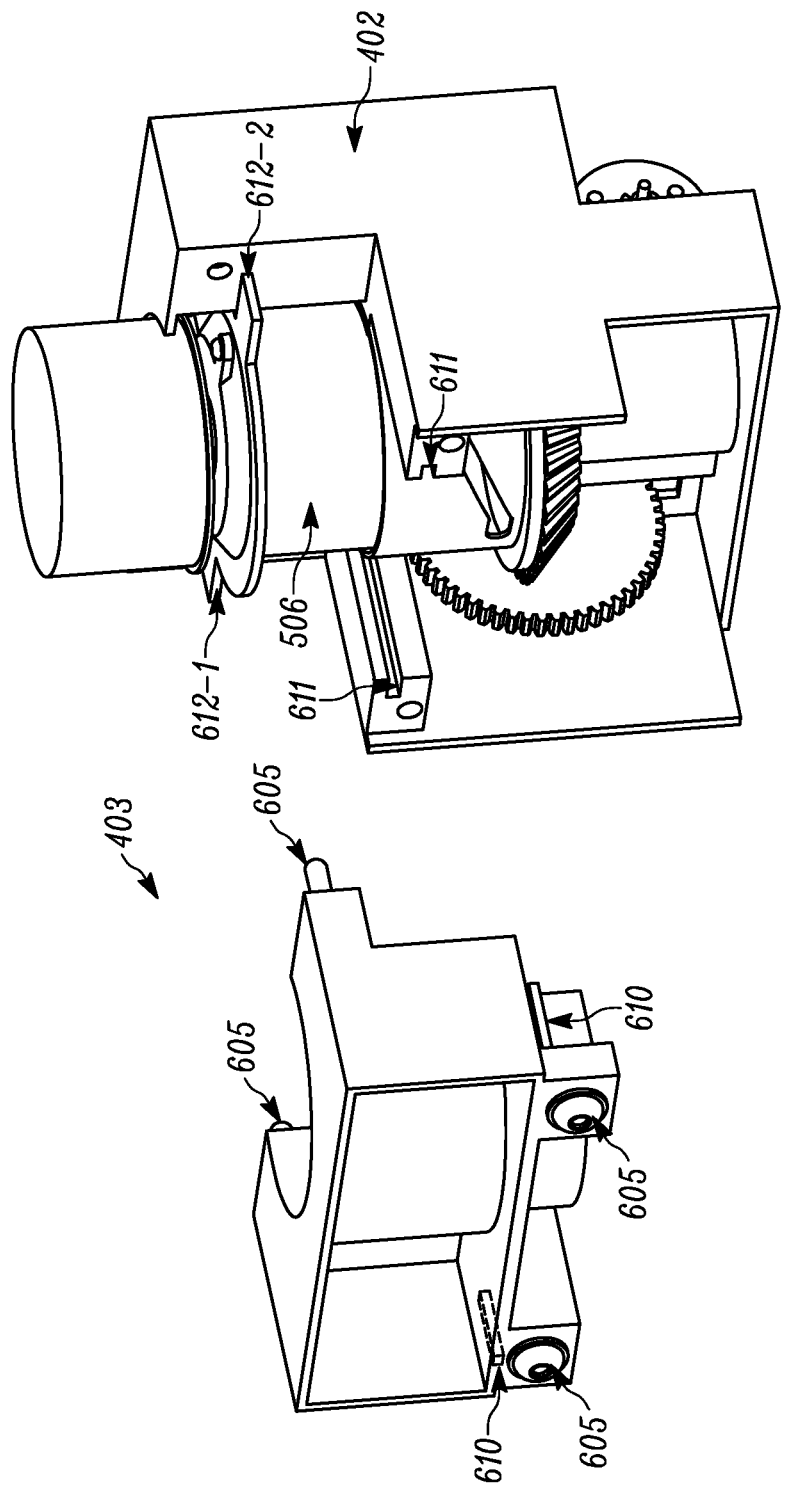
FIG. 6 shows a cap, which has two opposite guiding ribs that run into rails of a main housing.

FIG. 6 shows an end cap 403, which has two opposite guiding ribs 610-1 and 610-2 that run along and in rails 611-1 and 611-2 of a main housing 402. The end cap 403 is attached to the main housing 402 by four screws 605-1 through 605-4. The slider cylinder 506 has three guiding features 612-1 through 612-3 that run into rails 413-1, 413-2, and 4-13-3 (see FIG. 12) as shown in FIG. 4 when the end cap 403 and the main housing 402 are attached by screws 605.

Figure 7:
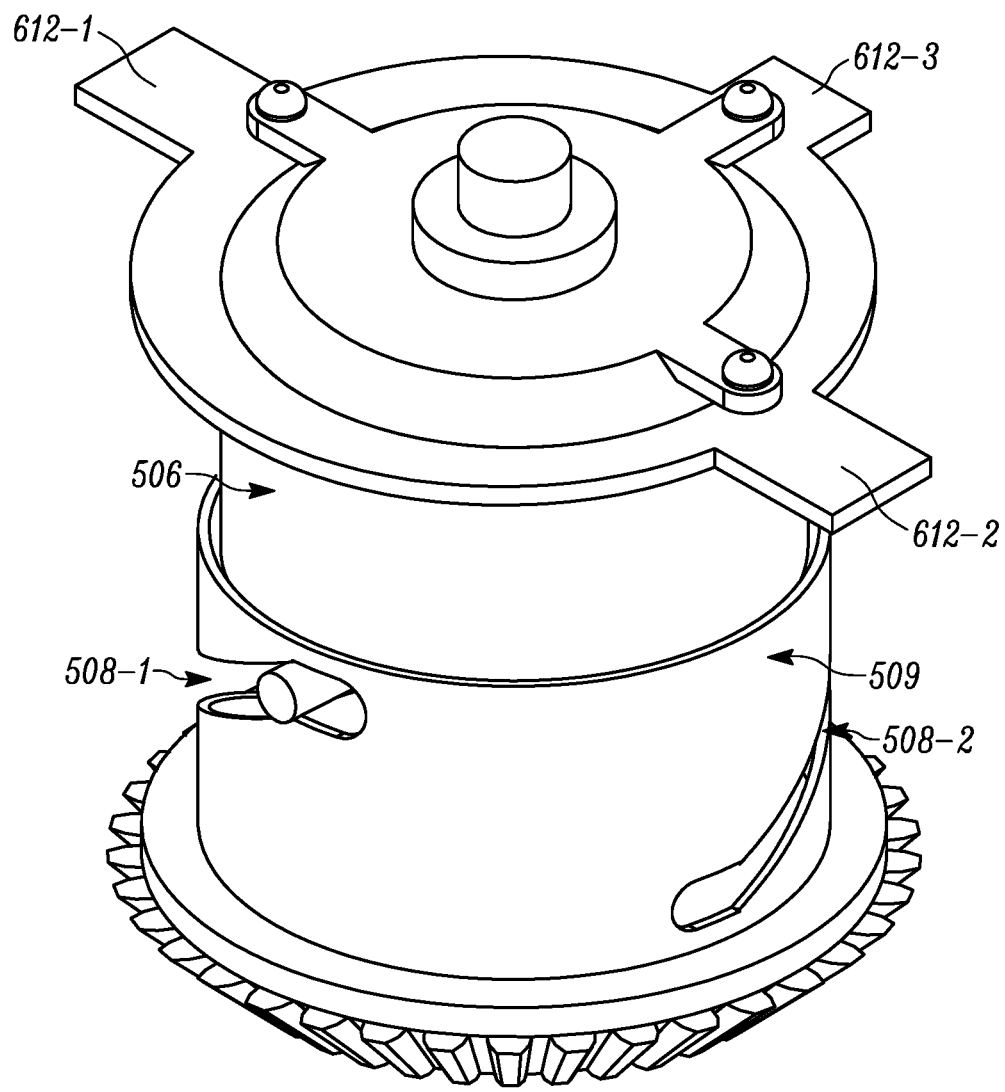
FIG. 7 shows the slider cylinder, which has the three guiding features and the two opposite ends of a pin that run into the cylindrical rails of the cylindrical cam.

FIG. 7 shows the slider cylinder 506, which has the three guiding features 612-1, 612-2, and 612-3 and the two opposite ends of the metallic pin 507, which ends run in the cylindrical rails 508-1 and 508-2 of the cylindrical cam 509.

Figure 8:
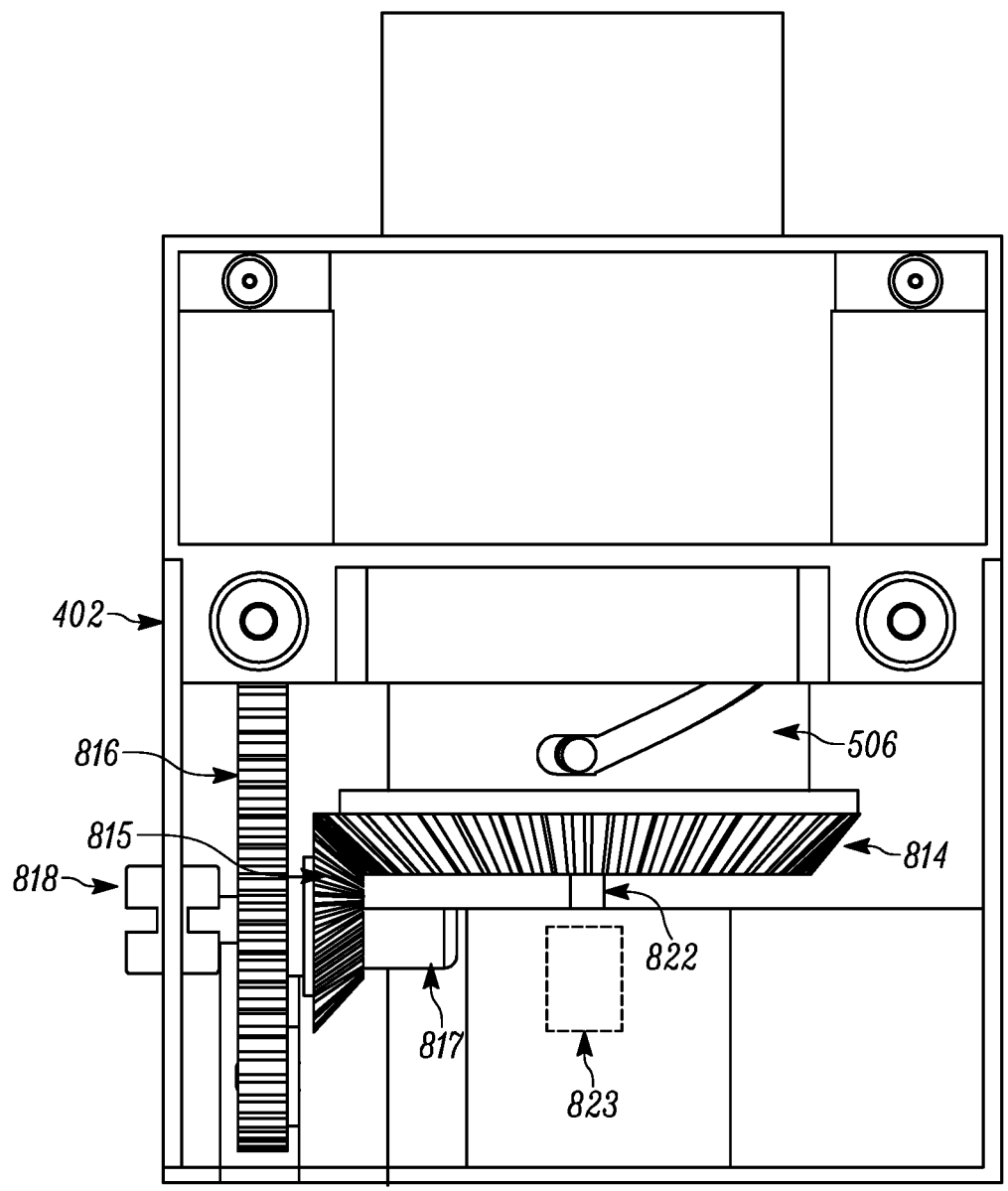
FIG. 8 shows a front view in which the slider cylinder is welded to a conical gear, which is mounted in an axis.

FIG. 8 shows a front view in which the slider cylinder 506 is welded to a conical gear 814, which is mounted on a shaft 822 the center line of which defines an axis of rotation for the slider cylinder 506 and the conical gear 814. The shaft 822 is placed in a bushing 823 that is located in a cylindrical cavity depicted by a rectangular area drawn with a dashed line inside the main housing 402. The conical gear 814 is moved by the conical pinion 815 and a first gear 816 that are mounted on a shaft 817 the center line of which defines an axis of rotation of the conical pinion 815 and the first gear 816. The shaft 817 has a bushing 818 that is attached to the main housing 402.

Figure 9:
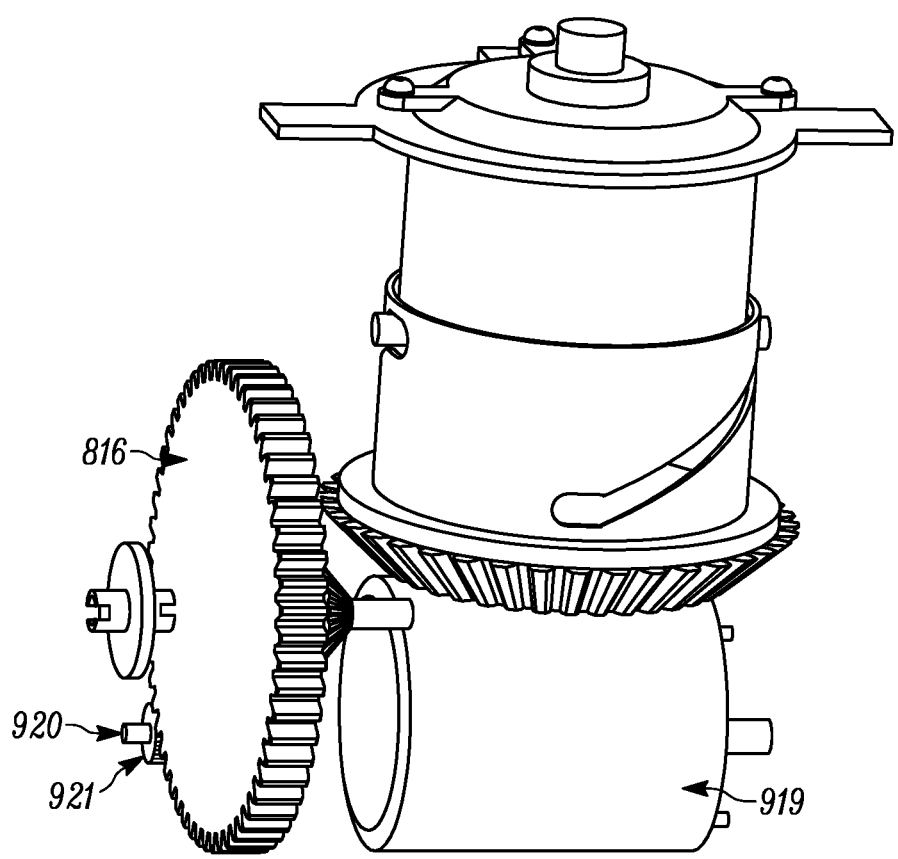
FIG. 9 shows a motor, which has an axis where a second gear is mounted.

FIG. 9 shows a motor 919, which has shaft 920 the center of which defines an axis of rotation of a second gear 21 that is mounted to on the shaft 920. The motor pinion 921 transmits movement to the first gear 816.

Assembly of a central selector knob with an elevation mechanism in accordance with embodiments of the invention will now be discussed.

Figure 10:
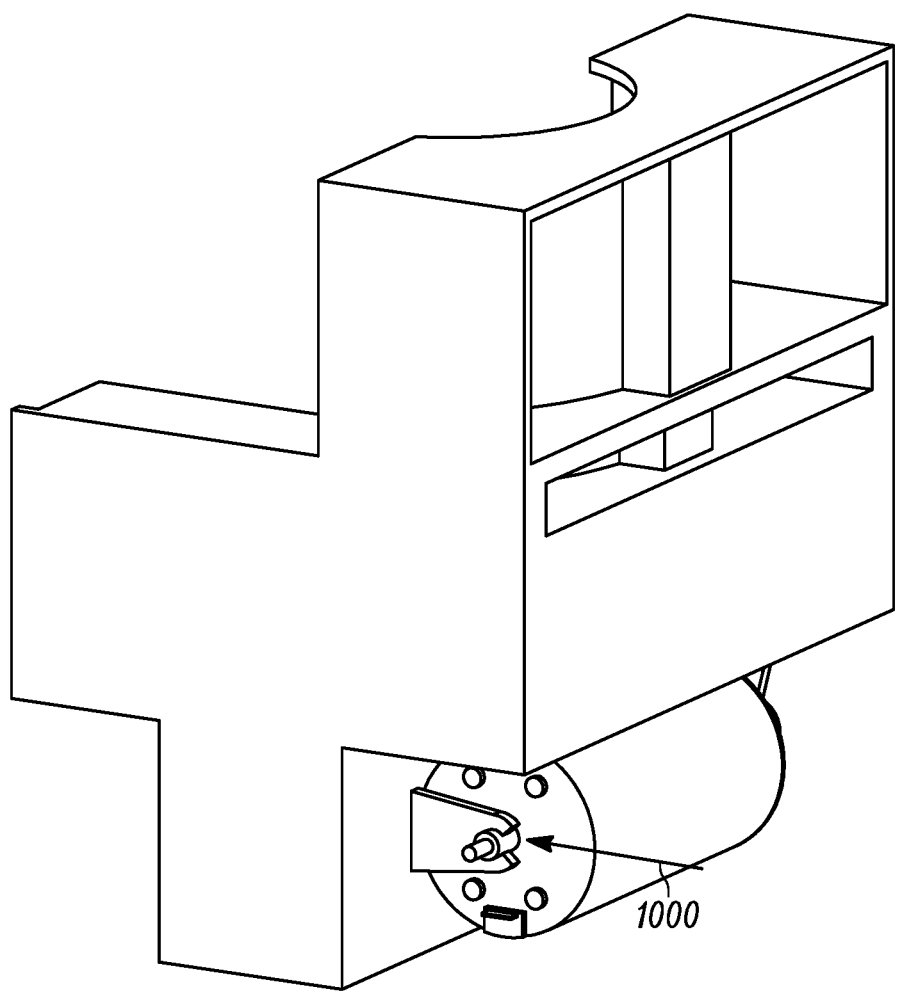
FIG. 10 depicts a first step for attaching the motor to the main housing.

FIG. 10 depicts a first step for attaching the motor 919 to the main housing 402. The motor 919 is assembled to the main housing 402 first by inserting the back side onto its support sliding in the direction shown by the arrow 1000 in FIG. 10.

Figure 11:
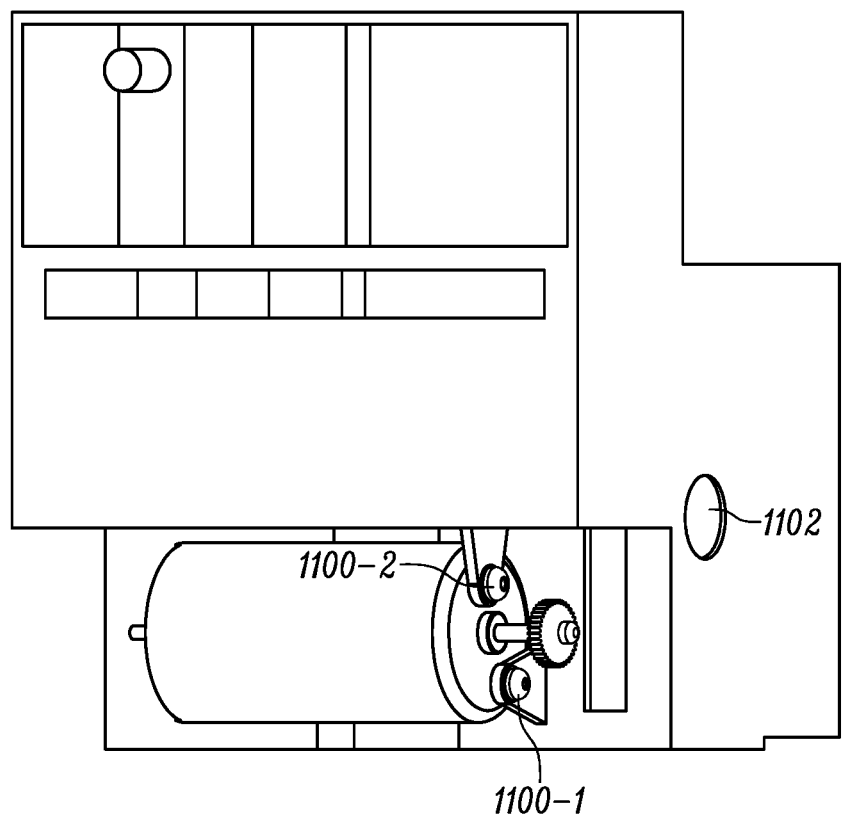
FIG. 11 depicts a second step for attaching the motor to the main housing.

FIG. 11 depicts a second step for attaching the motor 919 to the main housing 402. Two screws 1100-1 and 1100-2 hold the front side of the motor to the main housing 402. The main housing includes a hole 1102 for receiving the shaft bushing 818.

Figure 12:
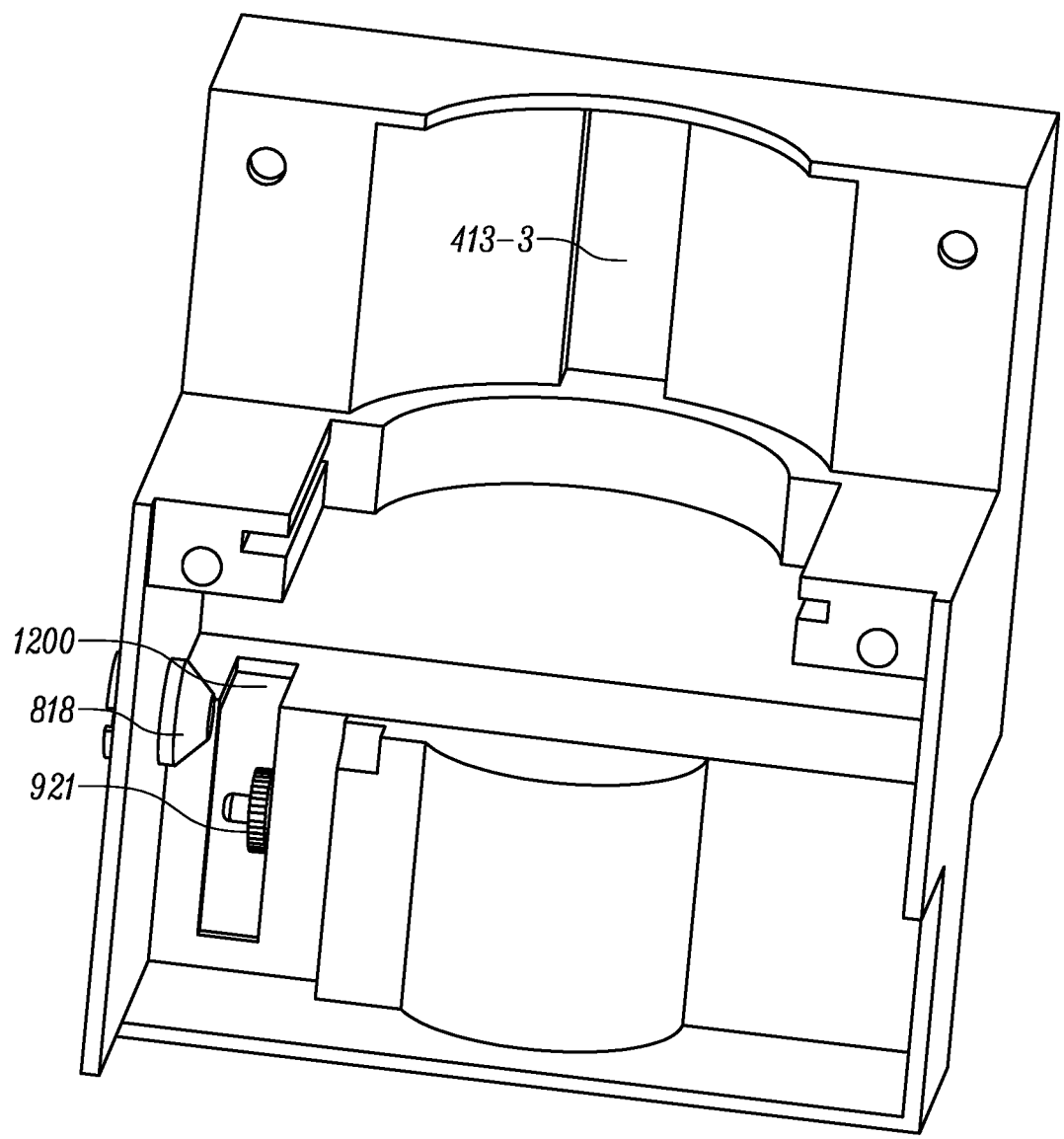
FIG. 12 depicts the shaft bushing inserted into the main housing.
Figure 13:
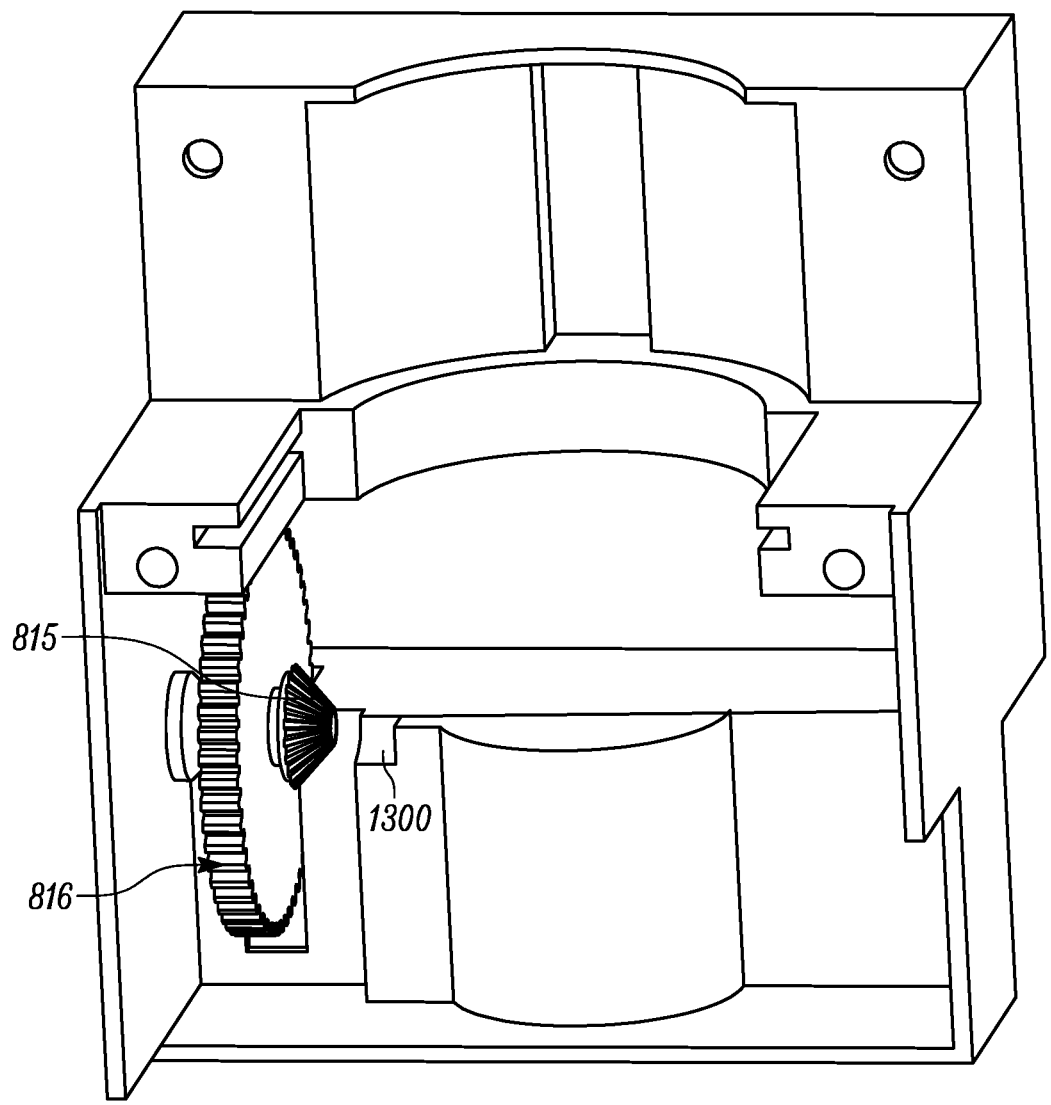
FIG. 13 depicts the main housing shaft support.

FIG. 12 depicts the shaft bushing inserted into the main housing. The shaft bushing 818 is assembled to the main housing 402 by pushing the shaft bushing into the hole 1102 and then turning the shaft bushing to lock it. After that (and using a fixture to hold the main housing), the first gear 816 will be placed into the main housing slot 1200 and into contact with the motor pinion 921. The shaft 817 will be pressed (still using a fixture to hold the part) through the shaft bushing 818, and the first gear 816, and the conical pinion 815, until it stops in the main housing shaft support 1300, which is a semi-cylindrical formation at the corner where two vertical and one horizontal surfaces of the main housing 402 meet, as shown in FIG. 13.

Figure 14:
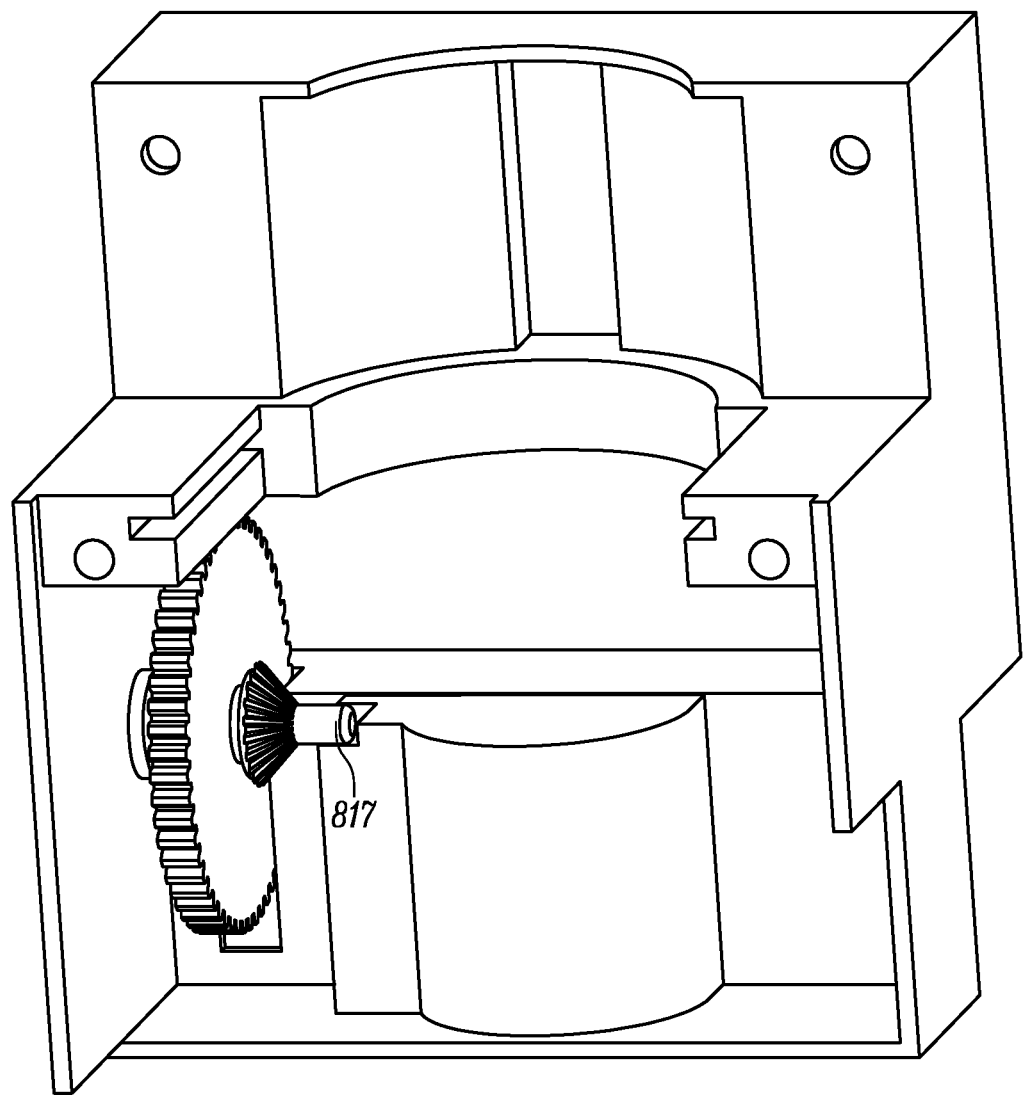
FIG. 14 shows the first-gear-and-conical-pinion shaft inserted through the shaft bushing, the first gear, the conical pinion, and the into the main housing shaft support.

FIG. 14 shows the first-gear-and-conical-pinion shaft 817 inserted through the shaft bushing 818, the first gear 816, the conical pinion 815, and the into the main housing shaft support 1300.

Figure 15:
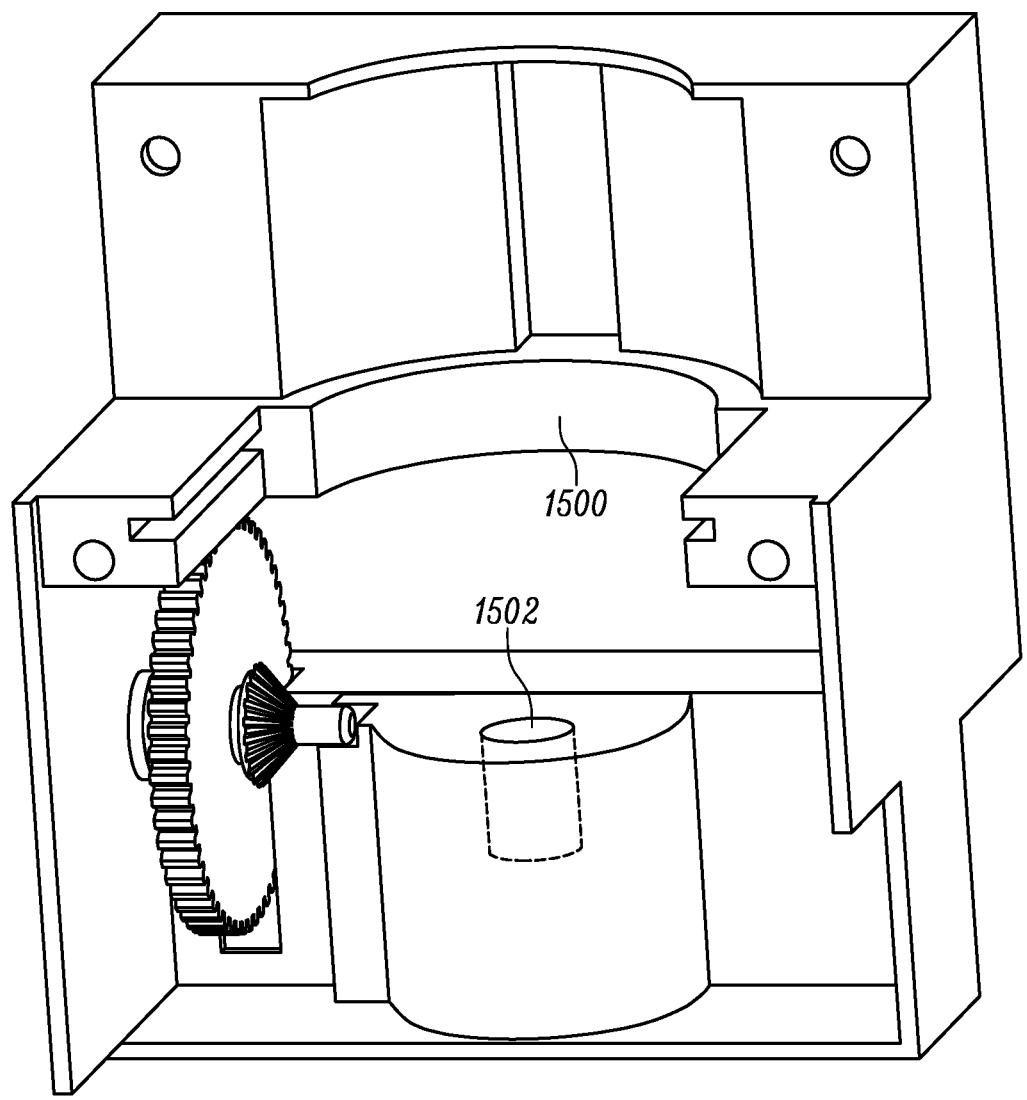
FIG. 15 depicts a half guiding surface for the slider cylinder and a cavity for the bushing.

The conical gear 814 and the cylindrical cam 509 are assembled into the main housing 402 as described in connection with FIG. 8. FIG. 15 depicts a half guiding surface 1500 for the slider cylinder and a cavity 1502 for the bushing 823. The second half of the bearing surface for the slider cylinder will come later from the end cap 403.

Figure 16:
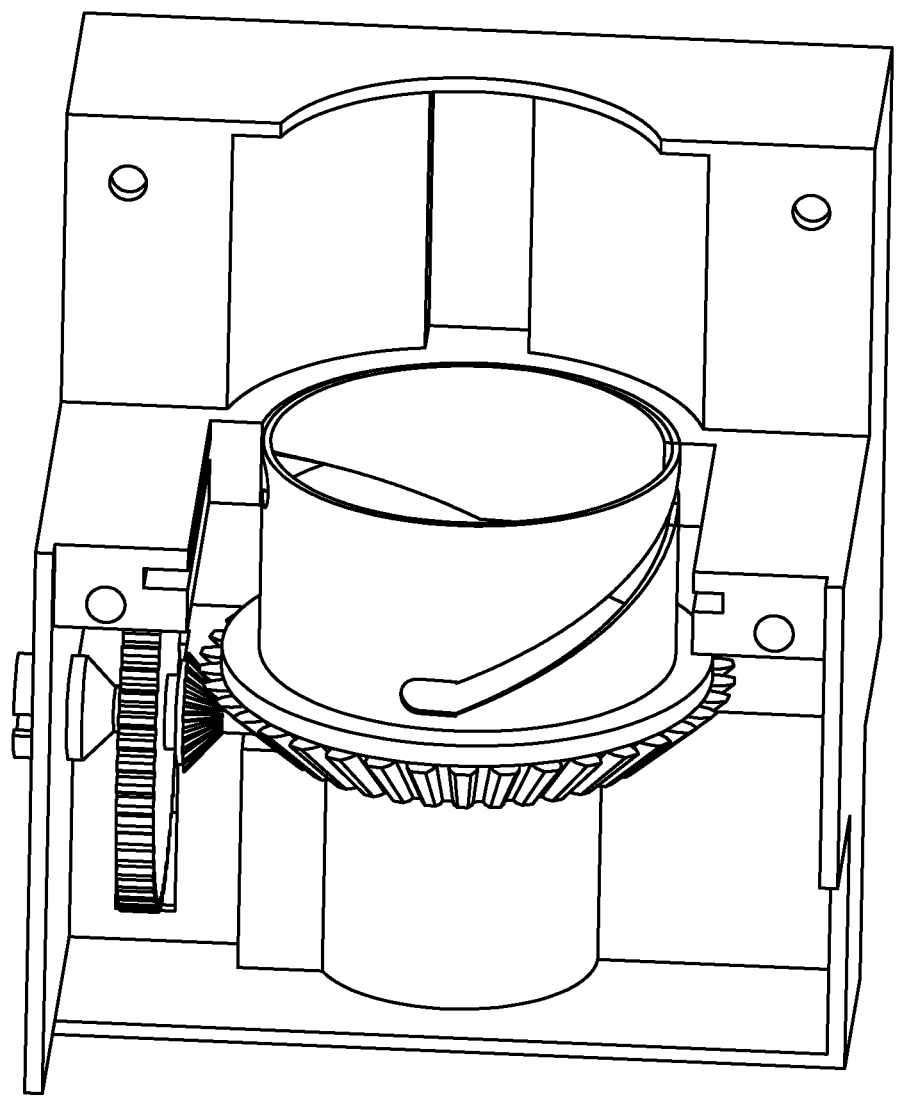
FIG. 16 shows the cylindrical cam and conical gear inserted into the main housing with the conical gear engaging the conical pinion.

FIG. 16 shows the cylindrical cam 509 and conical gear 814 inserted into the main housing 402 with the conical gear engaging the conical pinion 815.

Figure 17:
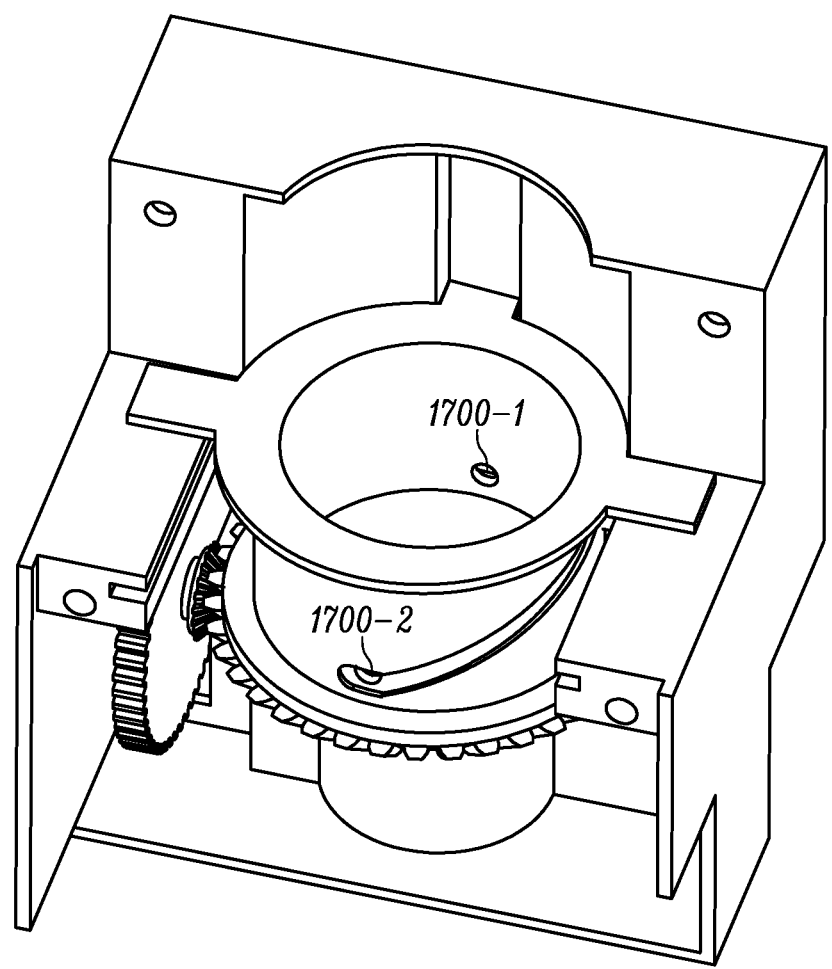
FIG. 17 shows the slider cylinder inserted into the cylindrical cam.

FIG. 17 shows the slider cylinder 506 inserted into the cylindrical cam 509. The metallic pin 507 is then pressed into the holes 1700-1 and 1700-2 in the slider cylinder 506 thereby engaging the slider cylinder to the cylindrical cam.

Figure 18:
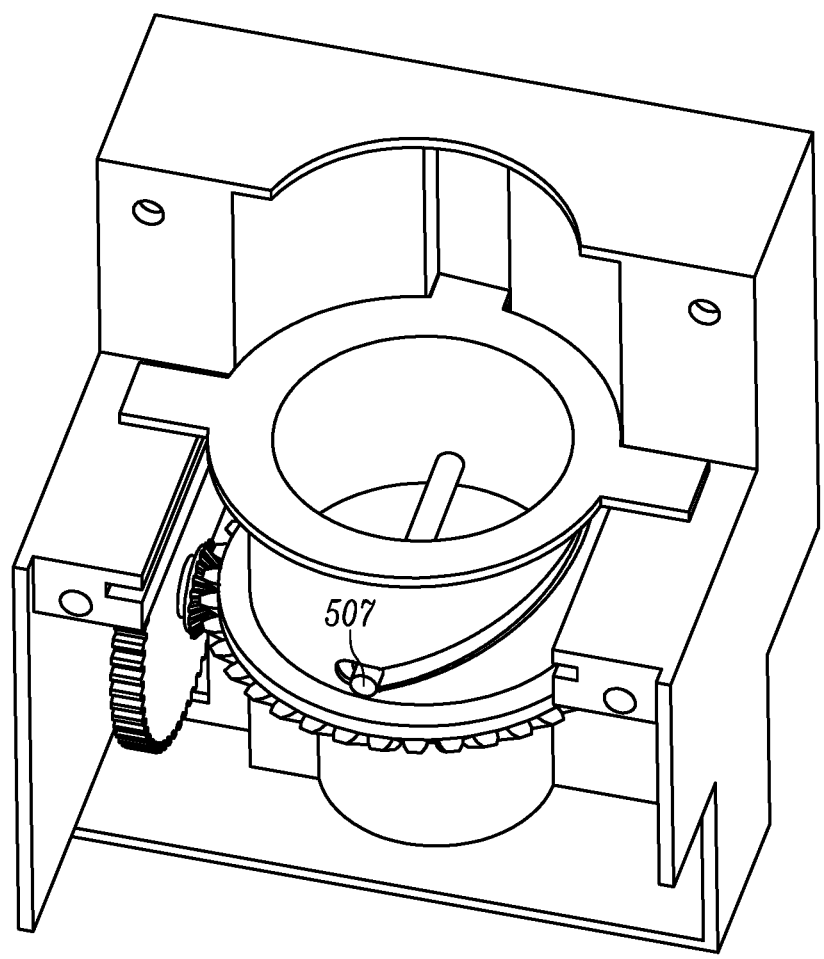
FIG. 18 shows the metallic pin in one of the cylindrical rails of the slider cylinder and inserted through both holes and in the slider cylinder.

FIG. 18 shows the metallic pin 507 in one of the cylindrical rails 508-1 of the slider cylinder 506 and inserted through both holes 1700-1 and 1700-2 in the slider cylinder 506.

Figure 19:
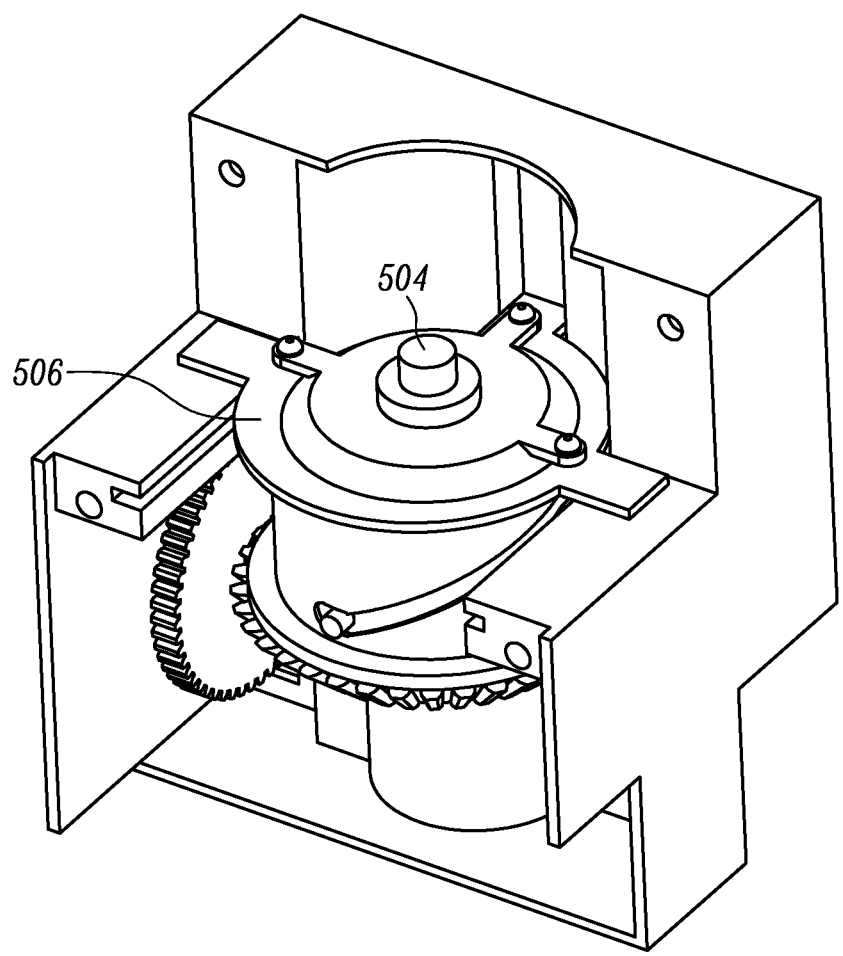
FIG. 19 shows the multifunctional switch assembled to the cylindrical slider, via three screws, as an example of various possible ways for attaching the multifunctional switch to the slider.

FIG. 19 shows the multifunctional switch 504 assembled to the cylindrical slider 506, via three screws, as an example of various possible ways for attaching the multifunctional switch to the slider.

Figure 20:
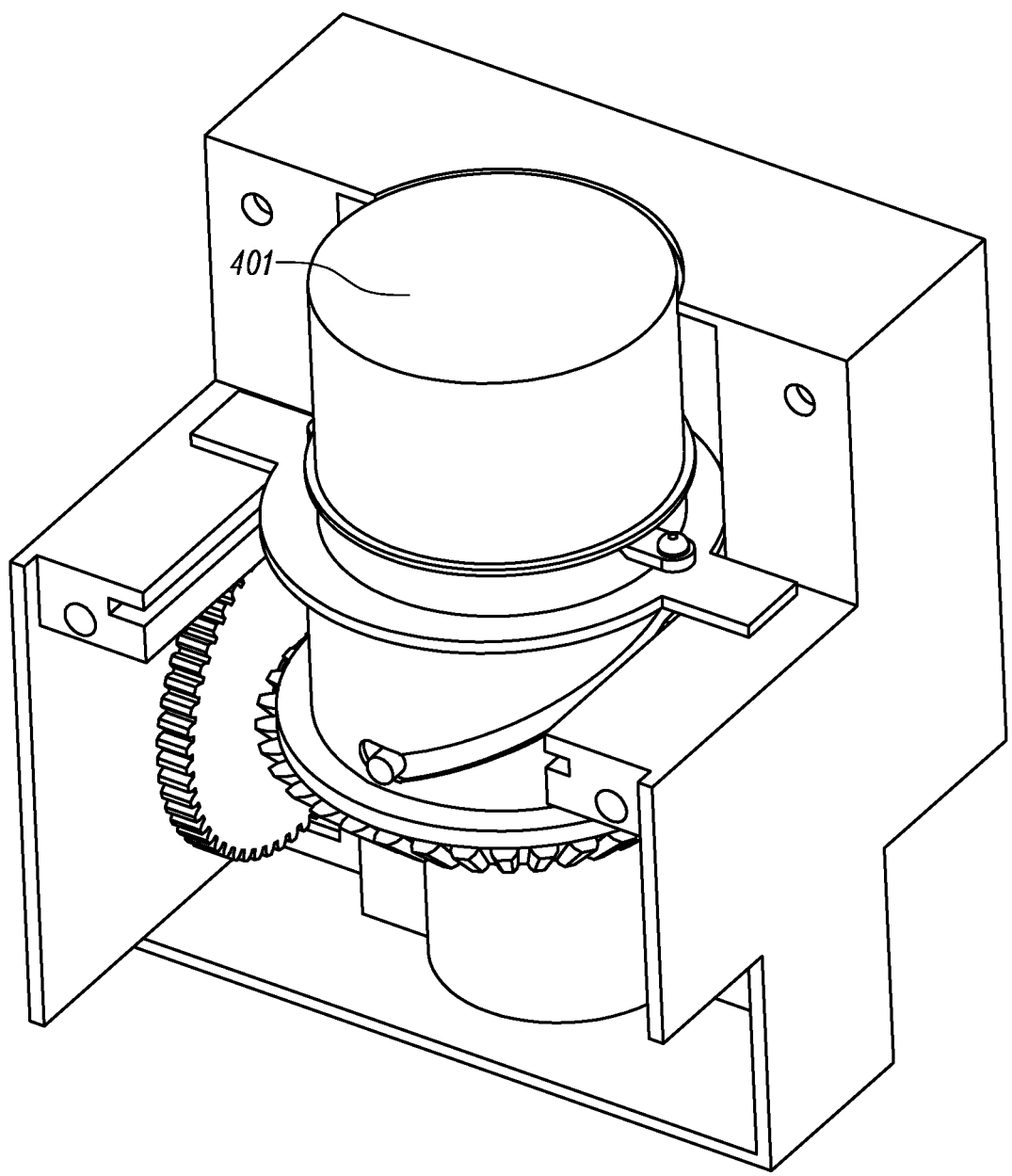
FIG. 20 shows the selector knob pressed onto the multifunctional switch.

FIG. 20 shows the selector knob 401 pressed onto the multifunctional switch.

Figure 21:
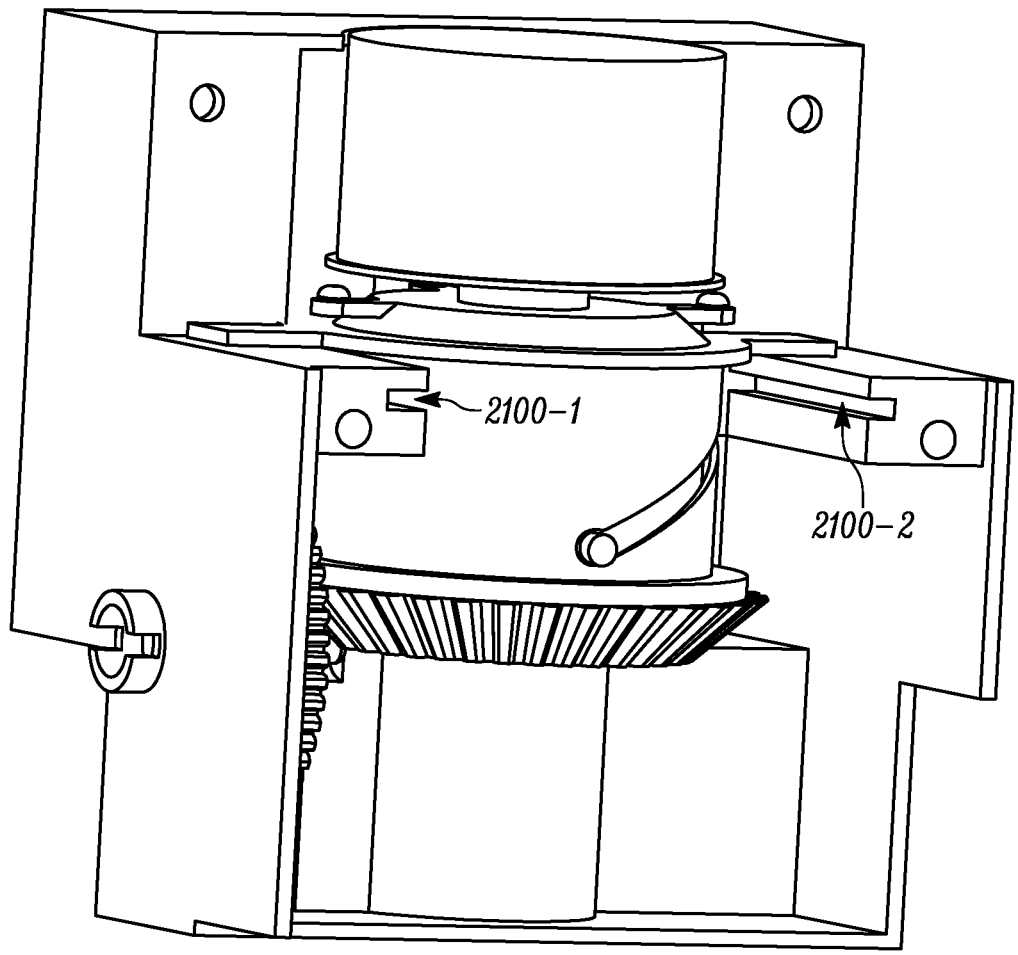
FIG. 21 shows grooves in the main housing that receive corresponding guiding ribs of the end cap.

FIG. 21 shows grooves 2100-1 and 2100-2 in the main housing that receive corresponding guiding ribs 610 of the end cap 403.

Figure 22:
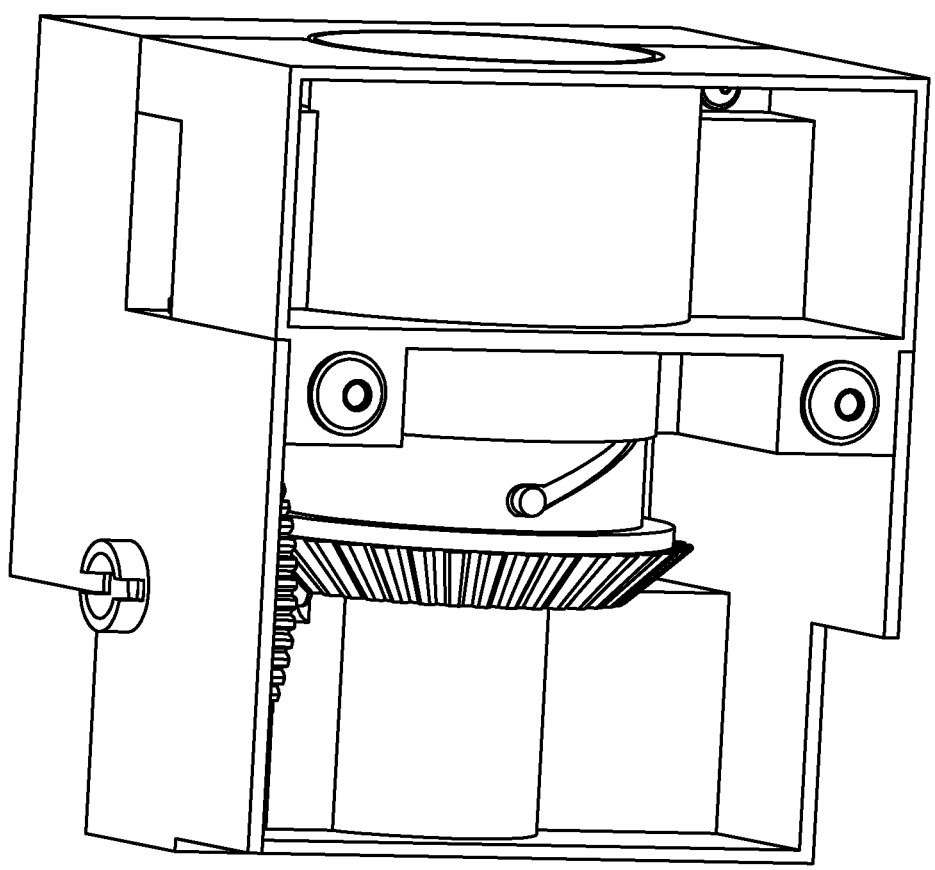
FIG. 22 shows the end cap fastened to the main housing by screws.

FIG. 22 shows the end cap 403 fastened to the main housing 402 by screws.

Embodiments of the invention provide advantages, including, but not limited to: relatively reduced volume of the device in comparison with conventional automotive central input devices; reduced amount of components and therefore reduced cost; increased reliability of the device by improving its robustness.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

The invention claimed is:

1. An apparatus comprising:
   a cylindrical cam having a circular cross section and having two cylindrical rails that are inclined along and formed into a curved sidewall of the cylindrical cam;
   a central input device mounted on a slider cylinder having two opposite ends of a pin, wherein the pin rotates about a central axis of rotation along with the slider cylinder, within the cylindrical cam, such that the opposite ends of the pin run in the two inclined cylindrical rails in the curved sidewall of the cylindrical cam to convert the rotational movement of the slider cylinder and the pin within the cylindrical cam into linear movement to move the central input device between an elevated operation position and a lowered storage position;
   a cap that has two opposite guiding ribs configured to slide into rails of a main housing, the cap being attached to the main housing such that the slider cylinder is enclosed by the main housing and the cap;
   a motor having an axis where a second gear is mounted, the second gear being configured and arranged to transmit movement to a first gear thereby causing the pin and the slider cylinder to rotate thereby causing the opposite ends of the pin to run in the inclined cylindrical rails to convert the rotational movement into linear movement thereby moving the central input device between the operation position and the storage position;
   wherein the slider cylinder is welded to a conical gear, which is mounted to a shaft in the main housing; and
   wherein the conical gear is moved by a conical pinion and the first gear that are mounted to a first-gear-and-conical-pinion shaft, which has a bushing that is attached to the main housing.

2. The apparatus of claim 1, wherein the slider cylinder has three guiding features.

3. The apparatus of claim 1, wherein the central input device further comprises a multifunction switch.

* * * * *